United States Patent
Stott

[11] 3,735,113
[45] May 22, 1973

[54] OPTICAL DISPLAY

[76] Inventor: Thomas H. Stott, 72 Kathryn Drive, Pleasant Hill, Calif. 94523

[22] Filed: Apr. 18, 1972

[21] Appl. No.: 245,210

[52] U.S. Cl. ............................240/6.4 G, 240/10 L
[51] Int. Cl. ..............................................F21v 33/00
[58] Field of Search ..................240/6.4 R, 6.4 G, 240/10 R, 10 L

[56] References Cited

UNITED STATES PATENTS

| 3,609,343 | 9/1971 | Howlett | 240/10 L |
| 2,224,319 | 12/1940 | Schroyer | 240/6.4 G |

FOREIGN PATENTS OR APPLICATIONS

| 651,577 | 10/1937 | Germany | 240/6.4 G |
| 1,498,436 | 9/1967 | France | 240/6.4 G |

*Primary Examiner*—Joseph F. Peters, Jr.
*Attorney*—Karl A. Limbach et al.

[57] ABSTRACT

A visual display is disclosed in the form of a wine glass having a hollow stem, a doubled walled bowl with an interior chamber communicating with the stem and a bundle of optical fibers extending through the stem into the chamber where the terminal ends of the bundle are spread out by the chamber walls. A removable light, switch and battery package is mounted in the base of the glass for shining light into the fiber bundle.

5 Claims, 4 Drawing Figures

PATENTED MAY 22 1973    3,735,113

OPTICAL DISPLAY

BACKGROUND OF INVENTION

A variety of light display devices have been prepared heretofore for use in enhancing the appearance of drinking glasses and other eating utensils. See for instance, the following U.S. Pat. Nos.: 2,177,337; 2,224,319; 2,532,181; 2,663,866; 2,745,947; 3,218,447 and 3,374,344. A variety of devices have also been used to create pleasing light displays with bundles of optical fibers. See for instance 3,431,410; D-215,478 and D-221,868.

I have devised a new type of optical display employing optical fibers which can be used very effectively in eating utensils and which may also be used to advantage in a variety of optical displays, such as lamps, Christmas tree ornaments and the like.

SUMMARY OF INVENTION

My new optical display supports a bundle of optical fibers in a confined mass, for instance, in a hollow stem and holds one end of the bundle in a spread-out fan-like array. This display has substantial advantages over prior fiber optic displays because the spread-out fibers are physically confined where they cannot be broken as the display is handled and where they cannot change shape as the fibers in the display age. The optical display is made with a body having inner and outer surfaces with the spread-out end of the fiber bundle supported and confined between these surfaces.

The device preferably employs a double wall structure with an interior chamber in which the spread-out end of the fiber bundle is confined. The chamber is curved so that an optical fiber extending through the interior chamber contacts both walls at different points along its length to positively confine it.

My new fiber optic display is particularly useful for providing a light display in eating utensils, and the preferred form of my invention is illustrated herein in the form of a champagne glass, though it will be appreciated that the invention can be used in a variety of other forms.

The optical display of this invention includes provision for illuminating the fiber bundle so that the free end of the fibers sparkle in the well-known manner. Preferably the illumination is provided in the form of a compact electrical assembly of battery, light bulb and switch removably mounted in the base of the glass where it can be removed when the glass is cleaned. Color wheels can be used if desired, and different colored light may be provided by filters or light emitting diodes. Provision can be made for the light to wink by incorporating multiple light emitting diodes with timing capacities into the electrical assembly, but incandescent light for white light or light emitting diodes for red light are preferred.

The wine glasses of this invention are preferably made as a double walled bowl with an interior chamber communicating with a hollow stem through which the fiber bundle extends. Where this form of construction is used, the collected end of the fiber bundle is preferably bonded to the wall of the hollow stem to hold the bundle in place and to prevent water entry into the double wall chamber when the glass is washed.

Alternatively, the glass may be formed by placing the fibers in a suitable mold and filling the mold with a thermoplastic or thermosetting plastic or glass at a temperature lower than the melting point of the fibers. In this latter regard, it will be understood that the optical fibers are made in the conventional way as drawn cores of glass or plastic coated with a cladding of a different glass or plastic which has a different index of refraction so that the exterior surface of the core is highly reflective. Where the fibers are molded into the body of a single walled wine glass, only the core of the fiber need be used since the remainder of the glass may form the cladding.

Other features and advantages of the invention will become apparent from the following description read in conjunction with the attached drawings, which disclose the preferred form of the invention made in the form of a champagne glass. In the drawing, FIG. 1 is a perspective view, partially broken away, of a champagne glass constructed in accordance with the principles of the invention;

Figure 1:
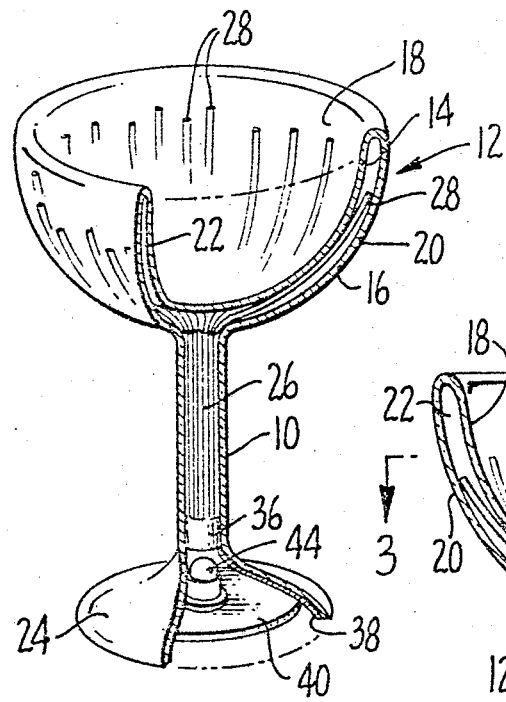

Referring now in detail to the drawing, and particularly to FIG. 1, the glass illustrated therein has a body of blown glass with a stem 10 and a double walled bowl 12 having an inner wall 14 and an outer wall 16 with inner and outer surfaces 18 and 20, respectively. The inner and outer walls 14 and 16 define a bowl shaped chamber 22 communicating with a hollow interior of stem 10, and a flared base 24 is formed on the bottom of the stem 10.

This blown glass structure may be formed in a way known to glass blowers where the inner and outer walls 14 and 16 are first blown as a generally spherical glass bubble and then the inner wall 14 is pulled into the bubble by applying suction to the stem 10 while the outer surface of the bubble is heated.

Figure 2:
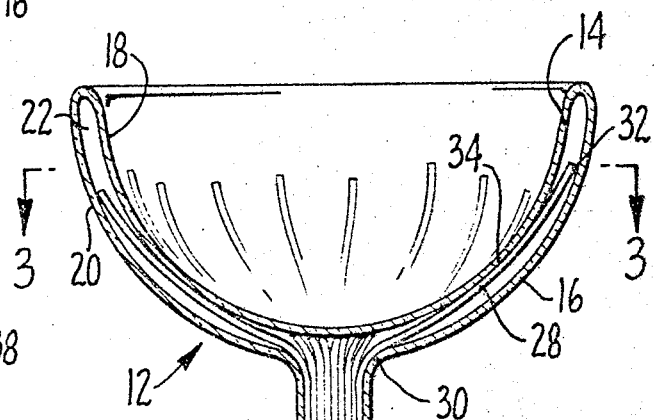
FIG. 2 is a vertical sectional view of the glass of FIG. 1.
Figure 3:
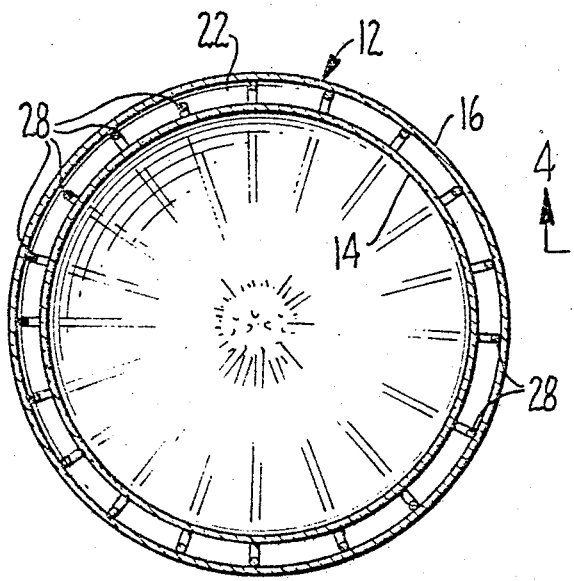
FIG. 3 is a horizontal sectional view of the glass of FIG. 1.
Figure 4:
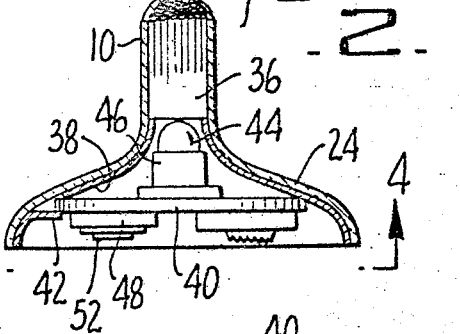
FIG. 4 is a bottom view of the glass of FIG. 1.
Figure 4:
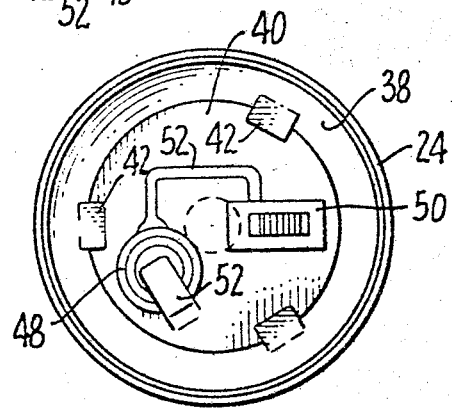

A bundle of optical fibers 26 extends up through the stem 10 terminating in a spread-out fan-like array of individual fibers in the chamber 22. While the fibers can all be cut to the same length, they are preferably formed with different lengths so that their upper ends are distributed throughout the volume of the chamber 22. It will be apparent that an individual fiber extending vertically from the bundle 26 first contacts the inner wall 14 so that the fiber is deflected outwardly and it then contacts the outer wall 16 so that it is deflected back vertically. The individual fiber engages the inner and outer walls at spaced apart locations so that it is confined in place in the chamber 22. For instance, fiber 28 is held in place by engagement with the outer wall 16 at points 30 and 32 with intermediate engagement with the inner wall at point 34 in FIG. 2.

The lower end of fiber bundle 26 is bonded to the glass of stem 10 by a body of epoxy cement 36.

Inside the base 24 of the glass is a preformed metal cover 38 which supports an electrical circuit assembly 40 on three ears 42. The cover 38 functions to obscure direct view of the electrical circuit assembly 40, and it is held into the base of the glass by resilient engagement with a curved lip around the mouth of base 24 formed by fire polishing the edge of the glass. The electrical circuit assembly 40 includes an incandescent lamp 44 in a socket 46 which is connected to a battery 48 through a switch 50 by means of wiring elements 52.

While one specific embodiment of the invention has been illustrated and described in detail herein, it is obvious that many modifications thereof may be made without departing from the spirit and scope of the invention.

I claim:

1. An eating utensil comprising:
a body having a base cavity and inner and outer portions at least one of which is translucent;
a bundle of optical fibers having a collected end and a spread-out end with said bundle mounted in said body with the collected end thereof communicating with said cavity for illumination from said cavity and with the spread-out end thereof confined between the inner and outer portions of said body; and
illuminating means in said cavity for illuminating the collected end of said bundle.

2. A drinking glass having a bottom cavity, a stem portion and a translucent bowl portion with said bowl portion having inwardly and outwardly facing surfaces;
a bundle of optical fibers extending through said stem portion and communicating with said bottom cavity for illumination therein and having a spread-out portion in said bowl portion confined between the inner and outer surfaces thereof; and
illuminating means in said cavity for illuminating the collected end of said bundle.

3. The drinking glass of claim 1 in which said bowl portion has a double wall with a bowl-shaped chamber therein; said inwardly and outwardly facing surfaces are provided on opposite sides of said chamber on the two walls of said double wall, and said spread-out end of said bundle is confined in said chamber by said double wall.

4. The drinking glass of claim 3 characterized further by the inclusion of an electrical control panel removably mounted in said cavity with said illuminating means mounted thereon and masking means for obscuring view of said cavity.

5. A visual display device comprising a body having a hollow stem portion and a translucent double wall portion with said double wall portion having an interior chamber between its double walls with said interior chamber communicating with the hollow interior of said stem;
a bundle of optical fibers extending through the hollow interior of said stem and into said chamber with the fibers of said bundle extending into said chamber from said bundle into engagement with both of the walls of said double wall for confinement and guidance thereby; and
illuminating means for directing light into the fibers of said bundle.

* * * * *